US006968250B2

(12) United States Patent
Reade et al.

(10) Patent No.: US 6,968,250 B2
(45) Date of Patent: Nov. 22, 2005

(54) INTELLIGENT AGENT SYSTEM AND METHOD FOR EVALUATING DATA INTEGRITY IN PROCESS INFORMATION DATABASES

(75) Inventors: Walter Caswell Reade, Appleton, WI (US); Douglas Gordon Barron Barber, Appleton, WI (US); Paul D. Fuller, Menasha, WI (US); Melissa S. Klaips, Greenville, WI (US); Charles Earl Markham, Appleton, WI (US); Michael Roy Pokorny, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 375 days.

(21) Appl. No.: 10/306,795

(22) Filed: Nov. 27, 2002

(65) Prior Publication Data

US 2003/0149373 A1    Aug. 7, 2003

Related U.S. Application Data

(60) Provisional application No. 60/344,747, filed on Dec. 28, 2001.

(51) Int. Cl.$^7$ ............................................ G06F 19/00
(52) U.S. Cl. .................... 700/109; 700/32; 700/95; 702/84
(58) Field of Search ..................... 700/32, 95, 108, 700/109, 132; 702/84

(56) References Cited

U.S. PATENT DOCUMENTS

| | | | |
|---|---|---|---|
| 3,946,212 A | * | 3/1976 | Nakao et al. ................. 702/84 |
| 4,663,220 A | | 5/1987 | Wisneski et al. |
| 4,704,116 A | | 11/1987 | Enloe |
| 4,798,603 A | | 1/1989 | Meyer et al. |
| 4,819,176 A | | 4/1989 | Ahmed et al. |
| 4,965,122 A | | 10/1990 | Morman |
| 5,063,507 A | | 11/1991 | Lindsey et al. |
| 5,086,397 A | | 2/1992 | Schuster et al. |
| 5,121,467 A | | 6/1992 | Skeirik |
| 5,176,668 A | | 1/1993 | Bernardin |
| 5,176,672 A | | 1/1993 | Bruemmer et al. |
| 5,192,606 A | | 3/1993 | Proxmire et al. |
| 5,226,992 A | | 7/1993 | Morman |
| 5,311,438 A | | 5/1994 | Sellers et al. |
| 5,359,525 A | | 10/1994 | Weyenberg |
| 5,364,382 A | | 11/1994 | Latimer et al. |
| 5,379,427 A | | 1/1995 | Hiroshima |

(Continued)

FOREIGN PATENT DOCUMENTS

EP    0217032 B1    4/1987

(Continued)

OTHER PUBLICATIONS

Chaudhuri et al, "An Overview of Data Warehousing and OLAP Technology," ACM Sigmod Record, vol. 27, Issue 1, pp. 65-74, Mar. 1997, New York, NY, U.S.A.

(Continued)

*Primary Examiner*—Jayprakash N. Gandhi
(74) *Attorney, Agent, or Firm*—Senniger Powers

(57) ABSTRACT

A data integrity module and method for evaluating data in a process information database. A neural network generates statistical patterns for specifying patterns for the data being evaluated. A fuzzy expert rules base specifies rules for evaluating the data. A processor, responsive to the rules base and the statistical patterns, identifies suspect data in the process information database by evaluating the data according to the rules base and the statistical patterns. A modification system modifies the suspect data in the process information database.

32 Claims, 5 Drawing Sheets

U.S. PATENT DOCUMENTS

| | | | | |
|---|---|---|---|---|
| 5,432,702 | A | 7/1995 | Barnett | |
| 5,471,614 | A | 11/1995 | Kakimoto | |
| 5,478,990 | A | 12/1995 | Montanari et al. | |
| 5,486,166 | A | 1/1996 | Bishop et al. | |
| 5,490,846 | A | 2/1996 | Ellis et al. | |
| 5,496,298 | A | 3/1996 | Kuepper et al. | |
| 5,509,915 | A | 4/1996 | Hanson et al. | |
| 5,532,928 | A | 7/1996 | Stanczyk et al. | |
| 5,540,796 | A | 7/1996 | Fries | |
| 5,595,618 | A | 1/1997 | Fries et al. | |
| 5,630,070 | A | 5/1997 | Dietrich et al. | |
| 5,638,519 | A | 6/1997 | Haluska | |
| 5,644,493 | A | 7/1997 | Motai et al. | |
| 5,751,914 | A | 5/1998 | Coley et al. | |
| 5,778,155 | A | 7/1998 | Hepner | |
| 5,781,911 | A | 7/1998 | Young et al. | |
| 5,828,989 | A | 10/1998 | Zvonar et al. | |
| 5,858,515 | A | 1/1999 | Stokes et al. | |
| 5,890,159 | A | 3/1999 | Sealby et al. | |
| 5,896,294 | A * | 4/1999 | Chow et al. | 700/121 |
| 5,909,176 | A | 6/1999 | Schrott et al. | |
| 6,038,486 | A | 3/2000 | Saitoh et al. | |
| 6,128,540 | A | 10/2000 | Van Der Vegt et al. | |
| 6,138,121 | A | 10/2000 | Costa et al. | |
| 6,141,647 | A | 10/2000 | Meijer et al. | |
| 6,144,893 | A | 11/2000 | Van Der Vegt et al. | |
| 6,178,418 | B1 | 1/2001 | Singer | |
| 6,195,590 | B1 | 2/2001 | Powell | |
| 6,212,530 | B1 * | 4/2001 | Kadlec | 707/201 |
| 6,227,643 | B1 | 5/2001 | Purcell et al. | |
| 6,259,367 | B1 | 7/2001 | Klein | |
| 6,266,656 | B1 | 7/2001 | Ohno | |
| 6,267,291 | B1 | 7/2001 | Blankenship et al. | |
| 6,291,003 | B1 | 9/2001 | Riemann et al. | |
| 6,294,997 | B1 | 9/2001 | Paratore et al. | |
| 6,308,107 | B1 | 10/2001 | Conboy et al. | |
| 6,317,700 | B1 | 11/2001 | Bagne | |
| 6,353,835 | B1 | 3/2002 | Lieuwen | |
| 6,354,493 | B1 | 3/2002 | Mon | |
| 6,362,738 | B1 | 3/2002 | Vega | |
| 6,366,824 | B1 | 4/2002 | Nair et al. | |
| 6,401,098 | B1 | 6/2002 | Moulin | |
| 6,415,192 | B1 * | 7/2002 | Satoguchi | 700/96 |
| 6,418,450 | B2 | 7/2002 | Daudenarde | |
| 6,451,154 | B1 | 9/2002 | Grabau et al. | |
| 6,501,501 | B1 | 12/2002 | Miyazawa | |
| 6,564,171 | B1 | 5/2003 | Peterson et al. | |
| 6,640,151 | B1 * | 10/2003 | Somekh et al. | 700/121 |
| 6,671,818 | B1 | 12/2003 | Mikurak | |
| 6,693,511 | B1 | 2/2004 | Seal | |
| 6,693,539 | B2 | 2/2004 | Bowers et al. | |
| 6,769,280 | B2 * | 8/2004 | Cao et al. | 72/17.3 |
| 2002/0155628 | A1 * | 10/2002 | Bulaga et al. | 438/14 |
| 2002/0177959 | A1 * | 11/2002 | Williams et al. | 702/41 |
| 2002/0178069 | A1 * | 11/2002 | Walker et al. | 705/26 |
| 2002/0186007 | A1 * | 12/2002 | Cao et al. | 324/207.18 |
| 2004/0134504 | A1 * | 7/2004 | Lane | 131/290 |

FOREIGN PATENT DOCUMENTS

| | | |
|---|---|---|
| WO | WO 99/42939 A1 | 8/1999 |
| WO | WO00/20939 A1 | 4/2000 |
| WO | WO02/48955 A1 | 6/2002 |

OTHER PUBLICATIONS

Hughes, "Designing the Financial Data Warehouse," Intelligent Enterprise, www.intelligententerprise.com/021115/518warehouse1 1.shtml, Nov. 15, 2002, 4 pages, U.S.A.

Chapman et al., "CRISP-DM 1.0: Step-by-Step Data Mining Guide," The CRISP-DM Consortium, Aug. 2000, 78 pages, U.S.A.

McFarlane, "Auto-ID Based Control," White Paper, Auto-ID Centre, Institute for Manufacturing, University of Cambridge, Feb. 1, 2002, 19 pages, Cambridge, UK.

Wong, "Integration of Auto-ID Tagging System with Holonic Manufacturing Systems," White Paper, Auto-ID Centre, Institute for Manufacturing, University of Cambridge, Sep. 1, 2001, 52 pages, Cambridge, UK.

Ashayeri et al, "Computer Integrated Manufacturing in the Chemical Industry," Production & Inventory Management Journal, vol. 37, No. 1, 10 pages, First Quarter 1996, U.S.A.

Yeager, "Mead's ERP System Integrates 'Best of Breed' Software," PIMA's North American Papermaker, vol. 82, No. 4, 4 pages, Apr. 2000, U.S.A.

"Taratec Develops New Solution to Help Life Sciences Industry Comply with FDA Regulation," LIMSource, http://www.limsource.com/whatnew/indnews/1to201.html, 2 pages, Jan. 16, 2001, U.S.A.

Babcock, "The Ask Master: An XML Technology Makes Retrieving Web Data Much Easier," Interactive Week, Sep. 24, 2001, p. 48, U.S.A.

Tacker et al., "A Fuzzy Logic/Neural System Approach to Signal Processing in Large Scale Decision Systems," 1989 IEEE Conference on Systems, Man, and Cybernetics, vol. III, pp. 1094-1097, Nov. 14, 1989, U.S.A.

Hillman, "Integrating Neural Nets and Expert Systems," AI Expert, Jun. 1990, pp. 54-59, U.S.A.

Simon, "The Engineering of Distributed Control Systems," http://www..plcopen.org/leading persons/rene simon.htm, 2 pages, accessed on Feb. 14, 2003, U.S.A.

Bonadio et al., "For Remote Stations, Fieldbus + PLC + Radio = Economical Network," InTech, Feb. 1, 1999, pp. 46-49, U.S.A.

Reilly, "Buyers to Suppliers: Manage My Inventory," Purchasing, vol. 129, No. 1, Jul. 13, 2000, 5 pages, U.S.A.

Weiss et al., "Predictive Data Mining: A Practical Guide," Morgan Kaufmann Publishers 1998, pp. 203-205, U.S.A.

Wieser, "Integration of Process Control Systems and Laboratory Information Systems Into the Logistic Chain," Automatisierungstechnische Praxis, vol. 39, No. 2, Feb. 1997, pp. 26-28.

* cited by examiner

INTELLIGENT AGENT SYSTEM AND METHOD FOR EVALUATING DATA INTEGRITY IN PROCESS INFORMATION DATABASES

CROSS-REFERENCE TO RELATED APPLICATIONS

This application claims the benefit of U.S. Provisional Application No. 60/344,747, filed Dec. 28, 2001, herein incorporated by reference.

FIELD OF THE INVENTION

The present invention relates generally to systems and methods associated with a manufacturing process. More particularly, the invention relates to correcting records in a process information database relating to the manufacturing process.

BACKGROUND OF THE INVENTION

There are many types of process information databases which are used in a variety of manufacturing environments such as pharmaceutical production, automobile manufacture, food and beverage production, pulp and paper processing and manufacture, injection molding of various items, production of electronics, printing processes and items resulting therefrom, etc. These databases include data generated by a manufacturing process which produces a product including one or more of the following products or parts therefor: pharmaceuticals, automobiles, food and beverage, pulp and paper, injection molded items, electronics, and printed items.

As the amount of information that can be collected increases and the amount of information that can stored increases, there is a growing need for systems and methods which evaluate the integrity of the data in such process information databases. One such process includes the manufacture of articles such as absorbent garments. While it is contemplated that the invention may be applicable to numerous manufacturing settings, the invention will be described in the context of the manufacture of articles such as absorbent garments since this context constitutes one embodiment according to the invention.

Articles such as disposable absorbent garments have numerous applications including diapers, training pants, feminine care products, and adult incontinence products. A typical disposable absorbent garment is formed as a composite structure including an absorbent assembly disposed between a liquid permeable bodyside liner and a liquid impermeable outer cover. These components can be combined with other materials and features such as elastic materials and containment structures to form a product which is specifically suited to its intended purposes. A number of such garments include fastening components which are intended to be connected together (e.g., pre-fastened) during manufacture of the garment so that the product is packaged in its fully assembled form.

For example, one such pre-fastened garment includes child's training pants, which have a central absorbent chassis and front and back side panels extending laterally out from the chassis adjacent longitudinally opposite ends thereof. A portion of each of the front and back side panels has a respective fastening component disposed thereon. During manufacture of the training pants, the central absorbent chassis is initially formed generally flat and then folded over so that the front and back side panels face each other. The respective fastening components of the front and back side panels are then aligned and connected together to define an engagement seam. Upon securing the front and back side panel fastening components together, the pre-fastened pair of training pants is in its fully assembled three-dimensional form having an interior space bounded in part by the engagement seam.

For a variety of purposes, including quality control, process control, material control, and so on, it is often desirable to monitor the presence of and/or interrelationships between one or more elements of a disposable absorbent garment. For instance, elements such as outer covers, liners, absorbent pads, side panels, elastic components, fastener components, etc. must be positioned or aligned with respect to each other and/or to other components as desired or otherwise intended in order to produce an acceptable product. Accordingly, inspection systems are commonly used to detect the presence and/or relative positions of such components during manufacturing. If an inspection system determines that one or more components are out of position and thus do not properly register with other components, the inspection system typically outputs one or more signals indicating that certain articles should be culled and discarded, that the process should be adjusted so as to bring out-of-position components into proper position, that the process should be adjusted so that subsequent components are brought into proper registration with one another, and so on.

One such registration inspection system is disclosed in U.S. Pat. No. 5,359,525, the disclosure of which is incorporated herein by reference. As described therein, registration inspection of a composite product during fabrication is accomplished by producing an image of the article and then analyzing the image to detect the relative positions of one or more components. The detected positions are then compared to desired positions to thereby determine whether one or more components are improperly positioned. Such registration inspection systems employ conventional video cameras for capturing visible, ultraviolet, x-ray, and infrared light reflected by and/or transmitted through components of the product in order to produce still video images of such components. Thus, after producing a video image of a composite article and its several components, the image can be analyzed to determine whether the components are properly positioned and registered with one another.

While data from inspection systems may certainly benefit from a data integrity check, one motivation for this invention stems more from the desire to have accurate information about machine delay, waste, raw material usage, productivity, etc. For example, the invention is applicable to systems and methods such as disclosed in U.S. patent application Ser. No. 10/306,794 filed simultaneously herewith on Nov. 27, 2002, entitled COMMUNICATION BETWEEN MACHINES AND FEED-FORWARD CONTROL IN EVENT-BASED PRODUCT MANUFACTURING, incorporated herein by reference.

Another motivation of the invention relates to the desire to have correct data in systems which rely on such data and may provide great weight to data. For example, the invention is applicable to systems and methods such as disclosed in U.S. patent application Ser. No. 10/306,881 filed simultaneously herewith on Nov. 27, 2002, entitled INTEGRATING EVENT-EASED PRODUCTION INFORMATION WITH FINANCIAL AND PURCHASING SYSTEMS IN PRODUCT MANUFACTURING, incorporated herein by reference. As another example, the invention is applicable to systems and methods such as disclosed in U.S. patent application ser. No. 10/306,668 filed simultaneously herewith on Nov. 27, 2002, entitled QUALITY MANAGEMENT AND INTELLIGENT MANUFACTURING WITH LABELS AND SMART TAGS IN EVENT-BASED PRODUCT MANUFACTURING, incorporated herein by reference.

Although highly useful for many applications, the large and varied amounts of data result in data of different qualities, some more accurate than others. Thus, there is a need for a higher order level of control of the quality of records in the process information database.

SUMMARY OF THE INVENTION

In one form, the invention comprises a data integrity system for evaluating data in a process information database including data generated by a manufacturing process. kAan evaluation resource is cooperatively associated with reference information. A processor, responsive to the reference information, accesses the data in the process information database and for evaluates the accessed data according to the reference information. The processor identifies suspect data in the evaluated data. A modification subsystem responsive to the processor modifies at least some of the suspect data in the process information database.

In another form, the invention is a data integrity module for evaluating data in a process information database including data generated by a manufacturing process. A neural network generates statistical patterns for specifying patterns for the data being evaluated. A rules base specifies rules for evaluating the data. A processor, responsive to the rules base and the statistical patterns, identifies suspect data in the process information database by evaluating the data according to the rules base and the statistical patterns. A modification system modifies the suspect data in the process information database.

In another form, the invention is a data integrity module in a system for manufacturing absorbent garments from raw material by a process implemented by a product line, wherein the system has a process information database of data relating to the process. The data integrity module evaluates the data in the process information database including data generated by a manufacturing process. The module comprises a neural network, a rules base, a processor and a modification system. The neural network generates statistical patterns for specifying patterns for the data being evaluated. The rules base specifies rules for evaluating the data. The processor is, responsive to the rules base and the statistical patterns for identifying suspect data in the process information database by evaluating the data according to the rules base and the statistical patterns. The modification system modifies the suspect data in the process information database.

In another form, the invention is a method for evaluating data integrity in a process information database including data generated by a manufacturing process. The method comprises:
providing reference information;
accessing the data in the process information database;
evaluating the accessed data according to the reference information;
identifying suspect data in the evaluated data; and
modifying at least some of the suspect data in the process information database.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

The methods and apparatus of the present invention can be used for improving data integrity in making a variety of articles such as disposable absorbent garments including diapers, training pants, feminine hygiene products, incontinence products, other personal care or health care garments, swim pants, athletic clothing, pants and shorts, and the like. As an example, the methods and apparatus of the present invention can be used to improve data integrity in the making of articles in which at least two elements of the article are connected together during the making thereof to assemble or "pre-fasten" the article. For ease of explanation, the methods and apparatus of the present invention are hereafter described in connection with making a diaper, generally indicated as 101 in FIG. 1.

Figure 1:
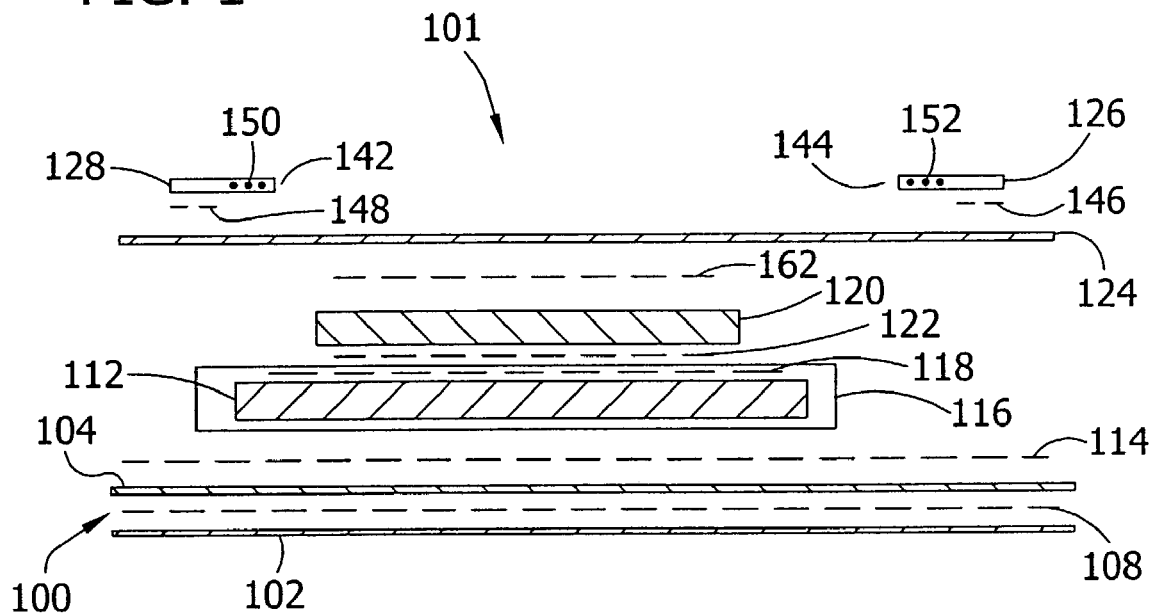
FIG. 1 is a cross sectional view of a diaper taken across line 8—8 of FIG. 3.
Figure 3:
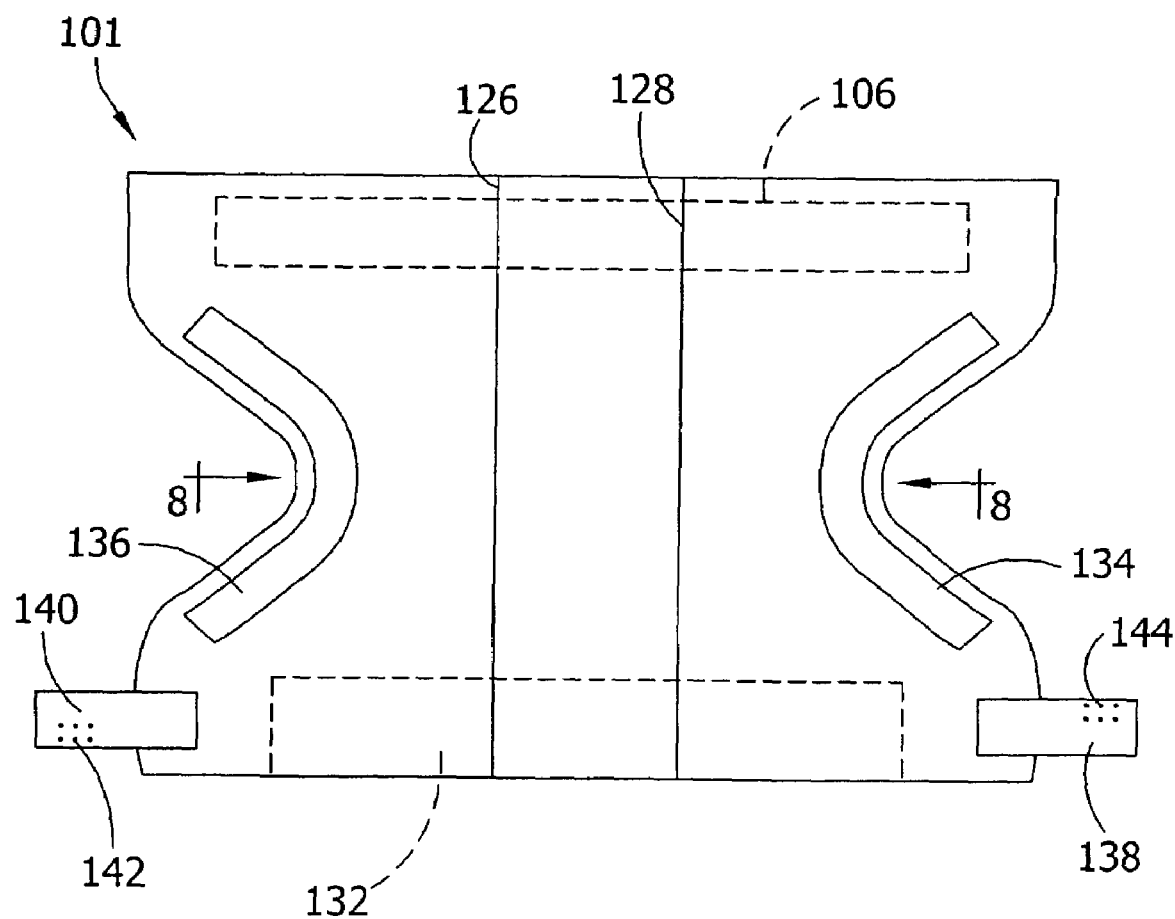
FIG. 3 is a top view of a diaper.

With reference now to the drawings, and in particular to FIG. 1, there is shown a cross-section of diaper 101 along the line 8—8 of FIG. 3, which comprises generally an outer cover 100 which comprises an outer layer 102 and an inner layer 104. The outer cover 100 is desirably stretchable and may or may not be somewhat elastic. As used herein, the term "stretchable" refers to a material that may be extensible and/or elastic. That is, the material may be extended, deformed or the like, without breaking, and may or may not significantly retract after removal of an extending force.

The extensible outer cover 100 can be composed of various materials which provide the desired properties set forth herein. For example, the extensible outer cover 100 is desirably composed of a neckable or otherwise necked fabric, but may instead, or may additionally, be composed of a creped fabric, a crimped fiber fabric, an extendable fiber fabric, a bonded-carded fabric, a micro-pleated fabric, polymer films or the like. The fabrics may be woven or nonwoven materials, such as spunbond fabrics.

U.S. Pat. No. 4,965,122 entitled REVERSIBLY NECKED MATERIAL, by M. T. Morman which issued Oct. 23, 1990, the entire disclosure of which is hereby incorporated by reference in a manner consistent with the present document, discloses a process for providing a reversibly necked nonwoven material which may include necking the material, then heating the necked material, followed by cooling.

As used herein, the term "neckable material or layer" means any material which can be necked such as a nonwoven, woven, or knitted material. The term "necked material" refers to any material which has been drawn in at least one dimension, (e.g. lengthwise), reducing the transverse dimension, (e.g. width), such that when the drawing force is removed, the material can be pulled back to its original width. The necked material typically has a higher basis weight per unit area than the un-necked material. When the necked material is pulled back to its original un-necked width, it should have about the same basis weight as the un-necked material. This differs from stretching/orienting a material layer, during which the layer is thinned and the basis weight is permanently reduced.

Typically, such necked nonwoven fabric materials are capable of being necked up to about 80 percent. For example, the extensible outer cover 100 may be composed of a material which has been necked from about 10 to about 80 percent, desirably from about 20 to about 60 percent, and more desirably from about 30 to about 50 percent for improved performance. For the purposes of the present disclosure, the term "percent necked" or "percent neckdown" refers to a ratio or percentage determined by measuring the difference between the pre-necked dimension and the necked dimension of a neckable material, and then dividing that difference by the pre-necked dimension of the neckable material and multiplying by 100 for percentage. The percent necked can be determined in accordance with the description in the above-mentioned U.S. Pat. No. 4,965,122.

The outer cover 100 is desirably a multi-layered laminate structure, and more desirably a necked, multi-layer laminate structure, to provide the desired levels of extensibility as well as liquid impermeability and vapor permeability. For example, the outer cover 100 of the illustrated embodiment is of two-layer construction, including an outer layer 102 constructed of a vapor and liquid permeable necked material and an inner layer 104 constructed of a liquid impermeable material, with the two layers being secured together by a suitable laminate adhesive 108. The outer cover may also be a single layer.

Referring now to FIG. 3, diaper 101 also includes a loop material or "pub patch" 106 adhesively bound to the outer cover for receiving hook material for fastening or closing the diaper during wear. The loop material may include a nonwoven fabric having continuous bonded areas defining a plurality of discrete unbonded areas. The fibers or filaments within the discrete unbonded areas of the fabric are dimensionally stabilized by the continuous bonded areas that encircle or surround each unbonded area, such that no support or backing layer of film or adhesive is required. The unbonded areas are specifically designed to afford spaces between fibers or filaments within the unbonded area that remain sufficiently open or large to receive and engage hook elements of the complementary hook material. In particular, a pattern-unbonded nonwoven fabric or web may include a spunbond nonwoven web formed of single component or multi-component melt-spun filaments. For example, the pub patch may be formed from a laminated structure including a polyethylene component and a polypropylene component adhesively bonded together and the polypropylene component is outwardly facing to accept a hook-type fastener.

At least one surface of the nonwoven fabric can include a plurality of discrete, unbonded areas surrounded or encircled by continuous bonded areas. The continuous bonded areas dimensionally stabilize the fibers or filaments forming the nonwoven web by bonding or fusing together the portions of the fibers or filaments that extend outside of the unbonded areas into the bonded areas, while leaving the fibers or filaments within the unbonded areas substantially free of bonding or fusing. The degree of bonding or fusing within the bonding areas desirably is sufficient to render the nonwoven web non-fibrous within the bonded areas, leaving the fibers or filaments within the unbonded areas to act as "loops" for receiving and engaging hook elements. Examples of suitable point-unbonded fabrics are described in U.S. Pat. No. 5,858,515 entitled PATTERN-UNBONDED NONWOVEN WEB AND PROCESS FOR MAKING THE SAME, by T. J. Stokes et al., the entire disclosure of which is incorporated herein by reference in a manner consistent with the present document.

Referring again to FIG. 1, diaper 101 additionally comprises an absorbent core 112 which can be adhesively bonded to a tissue wrap 116 (also commonly referred to as a tissue wrap sheet) by adhesive 118. Alternatively, the absorbent core need not have a tissue wrap and can simply be sandwiched between the outer cover and the bodyside liner. Absorbent core 112 may have any of a number of shapes, including rectangular, I-shaped, or T-shaped and is desirably narrower in the crotch region than in the front or back regions of the diaper 101. The size and the absorbent capacity of absorbent core 112 will be selected according to the size of the intended wearer and the liquid loading imparted by the intended use of the diaper. Further, the size and the absorbent capacity of the absorbent core 112 can be varied to accommodate various sized wearers. In addition, it has been found that the densities and/or basis weights of the absorbent core 112 can be varied. In the embodiment described herein, the absorbent core 112 typically has an absorbent capacity of at least about 300 grams of synthetic urine.

The absorbent core 112 desirably includes hydrophilic fibers and SAM, as described more fully below. Various types of wettable, hydrophilic fibrous material can be used to form the absorbent core 112. Examples of suitable fibers include naturally occurring organic fibers composed of intrinsically wettable material, such as cellulosic fibers; synthetic fibers composed of cellulose or cellulose derivatives, such as rayon fibers; inorganic fibers composed of an inherently wettable material, such as glass fibers; synthetic fibers made from inherently wettable thermoplastic polymers, such as particular polyester or polyamide fibers; and synthetic fibers composed of a nonwettable thermoplastic polymer, such as polypropylene fibers, which have been hydrophilized by appropriate means. The fibers may be hydrophilized, for example, by treatment with silica, treatment with a material which has a suitable hydrophilic moiety and is not readily removable from the fiber, or by sheathing the nonwettable, hydrophobic fiber with a hydrophilic polymer during or after the formation of the fiber. For the purposes of the present invention, it is contemplated that selected blends of the various types of fibers mentioned above may also be employed.

The high absorbency material may be in any of a wide variety of geometric forms. As a general rule, it is preferred that the high absorbency material be in the form of discrete particles or beads. However, the high absorbency material may also be in the form of fibers, flakes, rods, spheres, needles, or the like. In general, the high absorbency material is present in the absorbent core 112 in an amount of from about 5 to about 90 percent by weight, desirably in an amount of at least about 30 percent by weight, and even more desirably in an amount of at least about 50 percent by weight based on a total weight of absorbent core 112.

An example of high-absorbency material suitable for use in the absorbent core 112 is SANWET IM 3900 polymer available from Hoechst Celanese, a business having offices in Portsmouth, Va. Other suitable superabsorbents may include FAVOR SXM 880 polymer obtained from Stockhausen, a business having offices in Greensboro, N.C.

Tissue wrap 116 can be adhesively bonded to surge management layer 120 with adhesive 122. Surge management layer 120 is typically less hydrophilic than the absorbent core 112 and has an operable level of density and basis weight to quickly collect and temporarily hold liquid surges, to transport the liquid from its initial entrance point and to substantially completely release the liquid to the absorbent core. This configuration is intended to minimize the likelihood of the liquid pooling and collecting on the portion of the diaper against the wearer's skin, thereby reducing the feeling of wetness by the wearer. The structure of the surge management layer 120 also generally enhances the air exchange within the diaper 101.

Various woven and nonwoven fabrics can be used to construct the surge management layer 120. For example, the surge management layer 120 may be a layer made of a meltblown or spunbond web of synthetic fibers, such as polyolefin fibers. The surge management layer 120 may also be a bonded-carded-web or an airlaid web composed of natural and synthetic fibers. The bonded-carded-web may, for example, be a thermally bonded web that is bonded using low melt binder fibers, powder or adhesive. The webs can optionally include a mixture of different fibers. The surge management layer 120 may be composed of a substantially hydrophobic material, and the hydrophobic material may optionally be treated with a surfactant or otherwise processed to impart a desired level of wettability and hydrophilicity. As one example, the surge management layer 120 includes a hydrophobic, nonwoven material having a basis weight of from about 30 to about 120 grams per square meter.

The absorbent core 112 is typically positioned in liquid communication with the surge management layer 120 to receive liquids released from the surge management layer, and to hold and store the liquid. In the illustrated embodiment, the surge management layer 120 is a separate layer positioned over the absorbent core 112. The surge management layer 120 serves to quickly collect and temporarily hold discharged liquids, to transport such liquids from the point of initial contact and spread the liquid to other parts of the surge management layer 120, and then to substantially completely release such liquids into the absorbent core 112.

The surge management layer 120 can be of any desired shape. Suitable shapes include for example, circular, rectangular, triangular, trapezoidal, oblong, dog-boned, hourglass-shaped, or oval.

Additional materials suitable for the surge management layer 120 are set forth in U.S. Pat. No. 5,486,166 issued Jan. 23, 1996 in the name of C. Ellis et al. and entitled "FIBROUS NONWOVEN WEB SURGE LAYER FOR PERSONAL CARE ABSORBENT ARTICLES AND THE LIKE"; U.S. Pat. No. 5,490,846 issued Feb. 13, 1996 in the name of Ellis et al. and entitled "IMPROVED SURGE MANAGEMENT FIBROUS NONWOVEN WEB FOR PERSONAL CARE ABSORBENT ARTICLES AND THE LIKE"; and U.S. Pat. No. 5,364,382 issued Nov. 15, 1994 in the name of Latimer et al. and entitled "ABSORBENT STRUCTURE HAVING IMPROVED FLUID SURGE MANAGEMENT AND PRODUCT INCORPORATING SAME", the disclosures of which are hereby incorporated by reference in a manner consistent with the present document.

The surge management layer 120 may be adhesively bonded to the bodyside liner 124 with adhesive 162. The bodyside liner 124 is generally bonded to the inner layer 10 of outer cover 100 with adhesive 114 and is desirably pliable, soft feeling, and nonirritating to the wearer's skin, and is employed to help isolate the wearer's skin from the absorbent core 112. The bodyside liner 124 is less hydrophilic than the absorbent core 112, to present a relatively dry surface to the wearer, and is sufficiently porous to be liquid permeable, permitting liquid to readily penetrate through its thickness. A suitable bodyside liner 124 may be manufactured from a wide selection of web materials, but is desirably capable of stretching in at least one direction (e.g., longitudinal or lateral). Various woven and nonwoven fabrics including either or both synthetic and natural fibers can be used for the bodyside liner 124. For example, the bodyside liner 124 may be composed of a meltblown or spunbonded web of the desired fibers, and may also be a bonded-carded-web. Layers of different materials that may have different fiber deniers can also be used. The various fabrics can be composed of natural fibers, synthetic fibers or combinations thereof. For example, the bodyside liner may comprise a spunbonded polypropylene.

In particular embodiments, the bodyside liner 124 is desirably extensible and capable of extending along with the outer cover 100 for desired fit of the diaper on the wearer. For example, the bodyside liner 124 can be composed of various extensible materials such as a necked fabric, a creped fabric, a micro-pleated fabric, perforated polymer films or the like, as well as combinations thereof. The fabrics may be woven or nonwoven materials, such as spunbond fabrics, that may be elastic or non-elastic. Examples of suitable manufacturing techniques and suitable necked nonwoven fabric materials for such an extensible top sheet 61 are described in U.S. Pat. No. 4,965,122 entitled REVERSIBLY NECKED MATERIAL, by M. T. Morman which issued Oct. 23, 1990.

Figure 2:
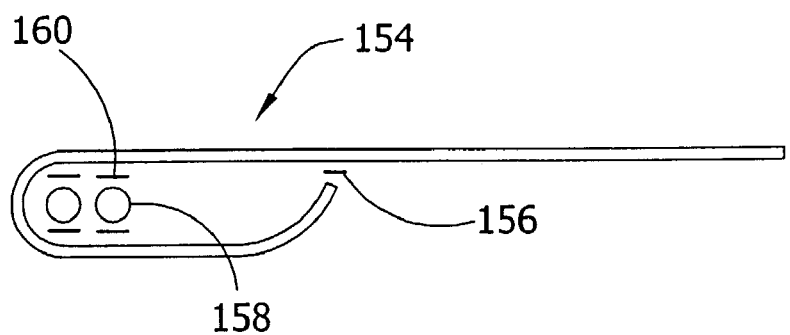
FIG. 2 is a cross sectional view of a containment flap.

Containment flaps 126 and 128 can be bonded to the outer cover, bodyside liner, or other intermediate layer. In the illustrated embodiment, the containment flaps 126 and 128 are bonded directly to the bodyside liner 124 with adhesive 146 and 148. Containment flaps are generally well known to those skilled in the art. For example, suitable constructions and arrangements for containment flaps are described in U.S. Pat. No. 4,704,116 issued Nov. 3, 1987 to K. Enloe, the disclosure of which is hereby incorporated by reference in a manner consistent with the present document. Containment flaps 126 and 128 can be bonded to the outer cover, bodyside liner, or other intermediate layer. In the illustrated embodiment, the containment flaps 126 and 128 are bonded directly to the bodyside liner 124 with adhesive 146 and 148. A suitable adhesive for bonding the containment flaps to the bodyside liner includes the adhesive of the present invention. Typically, the containment flaps are first formed outside of the diaper manufacturing process and subsequently introduced into the manufacturing process for attachment to the bodyside liner. As illustrated in FIG. 2, the containment flap 154 is formed off-line by folding the construction material for the containment flap 154 over onto itself and securing it with adhesive 156. The folding over of the material traps a stretchable material 158, secured to the containment flap 154 with adhesive 160, within the containment flap.

Referring now to FIG. 3, there is shown ears 138 and 140 (also commonly referred to as tabs or side panels) which are adhesively attached to diaper 101. Typically, the ears 138 and 140 are separately formed and attached to the outer cover, to the bodyside liner, between the outer cover and the bodyside liner, or to other suitable components located in the ear attachment zone of the diaper. The ears 138 and 140 may be elastic or otherwise rendered elastomeric. For example, the ears 138 and 140 may be an elastomeric material such as a neck-bonded laminate (NBL) or stretch-bonded laminate (SBL) material. Methods of making such materials are well known to those skilled in the art and are described in U.S. Pat. No. 4,663,220 issued May 5, 1987 to Wisneski et al., U.S. Pat. No. 5,226,992 issued Jul. 13, 1993 to Morman, and European Patent Application No. EP 0 217 032 published on Apr. 8, 1987 in the names of Taylor et al., the disclosures of which are hereby incorporated by reference in a manner consistent with the present document. Examples of articles that include elasticized side panels and selectively configured fastener tabs are described in U.S. Pat. No. 5,496,298 issued Mar. 5, 1996 to Kuepper et al.; U.S. Pat. No. 5,540,796 to Fries; and U.S. Pat. No. 5,595,618 to Fries; the disclosures of which are also incorporated herein by reference in a manner consistent with the present document. Alternatively, the ears 138 and 140 may be formed integrally with a selected diaper component. For example, the ears 138 and 140 can be integrally formed with the inner or outer layer of the outer cover or may be integrally formed from with the bodyside liner.

Fastening components, such as hook fasteners 142 and 144 are typically employed on the ears 138 and 140 to secure the diaper 101 on the body of a child or other wearer by connecting the ears 138 and 140 to the pub patch (loop fastener) previously described. The hook fasteners 142 and 144 are adhesively bonded (not shown) to the ears 138 and 140. Alternatively, other fastening components (not shown), such as buttons, pins, snaps, adhesive tape fasteners, cohesives, mushroom-and-loop fasteners, or the like, may be employed. Desirably, the interconnection of the fastening components is selectively releasable and re-attachable. In the illustrated embodiment, the hook fasteners 142 and 144 are attached to and extend laterally out from the respective ears 138 and 140 at the back region of the diaper 101.

To provide improved fit and to help further reduce leakage of body exudates from the diaper 101, elastic components are typically incorporated into the diaper 101, particularly at the waist area and the leg areas. For example, as illustrated in FIG. 3, the diaper 101 has a waist elastic component 132 and leg elastics 134 and 136. The waist elastic 132 is configured to gather and shirr the end margins of the diaper 101 to provide a resilient, comfortable close fit around the waist of the wearer.

The leg elastic components are typically secured between the outer and inner layers of the outer cover, such as by being bonded to one or both layers by a laminate adhesive. It should be understood, however, that the leg elastic components may be secured between the outer and inner layers of the outer cover by other methods.

Each elastic component generally comprises an elongate substrate, such as a sheet or ribbon, having threads or strands of elastic material secured to the substrate in generally parallel, spaced relationship with each other. As an example, one suitable elastic material from which the elastic strands may be constructed is a dry-spun coalesced multi-filament elastomeric thread sold under the trade name LYCRA and available from E. I. du Pont de Nemours (Wilmington, Del.). The various components of the diaper 101 are integrally assembled together using a suitable form of attachment, such as a combination of adhesives, sonic bonds, thermal bonds.

Examples of other diaper configurations suitable for use in connection with the instant application that may or may not include diaper components similar to those described previously are described in U.S. Pat. No. 4,798,603 issued Jan. 17, 1989, to Meyer et al.; U.S. Pat. No. 5,176,668 issued Jan. 5, 1993, to Bernardin; U.S. Pat. No. 5,176,672 issued Jan. 5, 1993, to Bruemmer et al.; U.S. Pat. No. 5,192,606 issued Mar. 9, 1993, to Proxmire et al., and U.S. Pat. No. 5,509,915 issued Apr. 23, 1996 to Hanson et al., the disclosures of which are hereby incorporated by reference in a manner consistent with this document.

The various materials noted above and the various configurations and their placement usually require a variety of inspection and monitoring systems. These systems may include video cameras capturing a large database of video information as well as other sensors to keep track of the status of each product and its conditions. In order to monitor a large quantity of product parameters for a large amount of products, such systems generate very large databases, the integrity of which needs to be evaluated. Furthermore, in order to have accurate information about machine delay, waste, raw material usage, productivity, and other aspects of the process of manufacture and the resulting products, data integrity must be maintained.

System with Data Integrity Module

Figure 4:
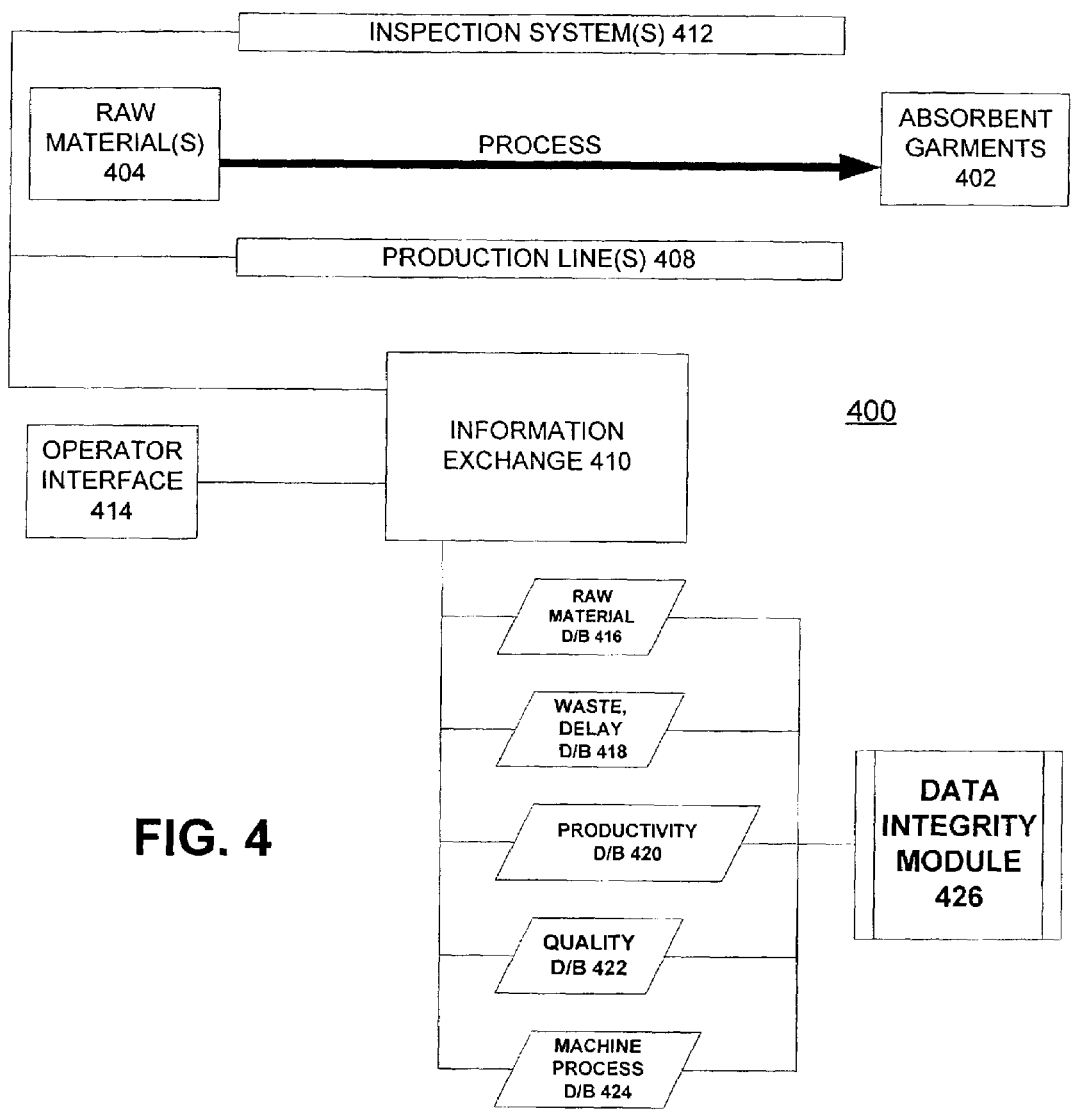
FIG. 4 is a block diagram of an information exchange system in combination with a data integrity module according to the invention.

FIG. 4 is a block diagram of a system 400 according to the invention for manufacturing such items as absorbent garments, pharmaceuticals, automobiles, food products, beverages, pulp and paper products, injection molded parts, electronics, printed material, etc., 402 (such as described above with regard to FIGS. 1–3 in the context of an absorbent garment) from raw material 404 according to a process 406 implemented by one or more production lines 408. Such systems usually include an information exchange 410 for managing the various information needed to operate the system 400. Optionally, information exchange 410 may interface with one or more inspection systems 412 which monitor the process 406 and the production lines 408. The information exchange 410 may also be associated with an operator interface 414 for allowing the operator to access information or otherwise access the system 400.

Such systems usually include one or more process information databases (D/B) such as a raw material database 416, a waste or delay database 418, a productivity database 420, a quality database 422 and/or a machine process database 424. Such databases store or process information and are beneficial in that they can be used to give an overall picture of the process 406. In addition, such databases include data which allow trends in the process 406 to be tracked and data which shows opportunities where process 406 and the production line 408 can be improved.

One challenge to using databases such as databases 416–424 to record process information is that it is difficult to know when errors or other corruption has occurred in the data stored in these databases. These errors can be caused by such things as software glitches, hardware failure or by human mistakes, and can limit the accuracy of the data analysis and, thus, limiting the ability to accurately and effectively control the process 406 and the production lines 408. The overwhelming size of many process information databases makes manual error checking impractical.

Figure 5:
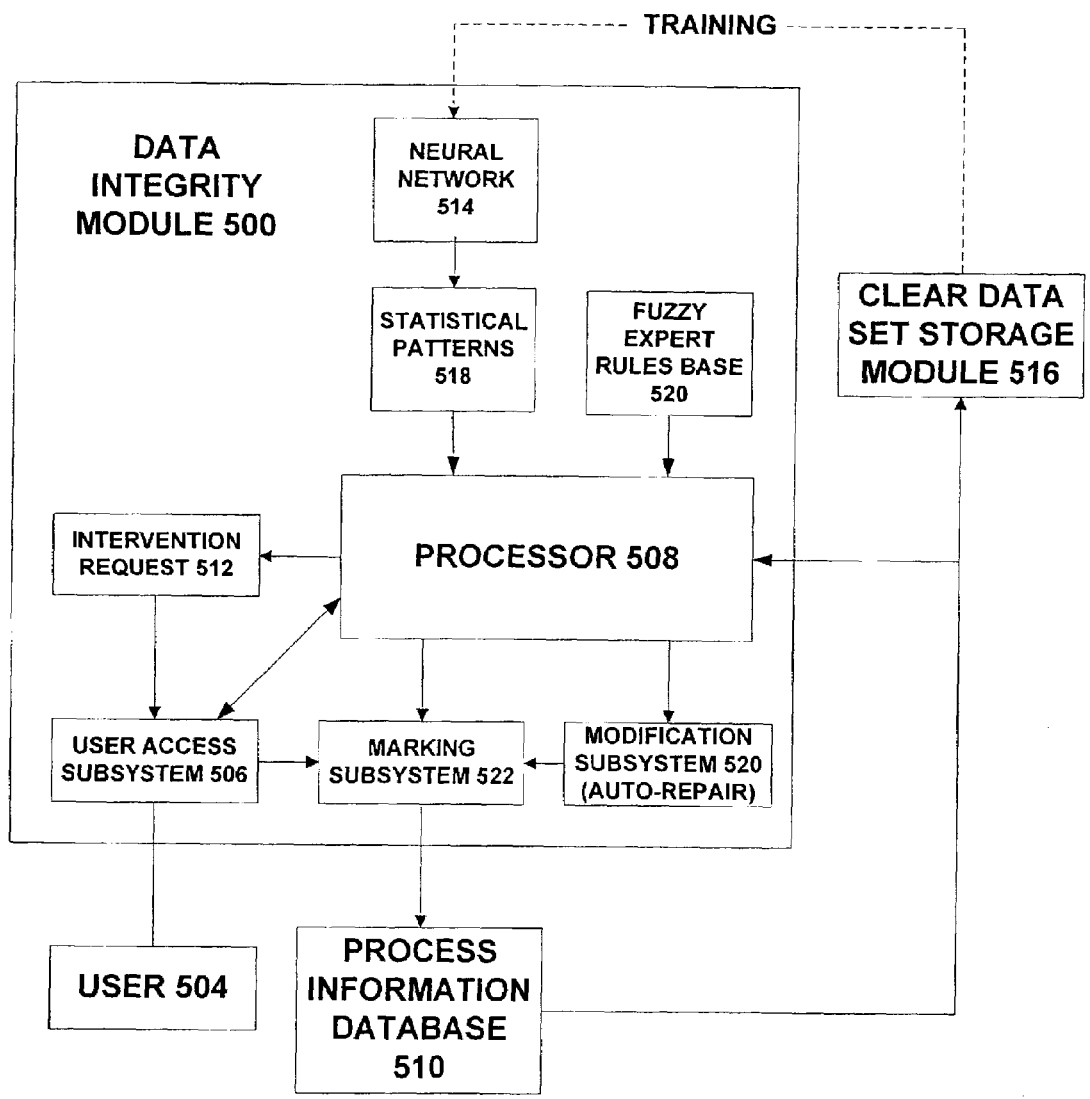
FIG. 5 is a block diagram of a data integrity module according to the invention.

According to one aspect of the invention, an intelligent agent in the form of a data integrity module 426 is associated with each of the databases 416–424 to automatically check data integrity as it is recorded in a database. FIG. 5 illustrates one embodiment of a data integrity module 500 according to the invention. The module 500 is referred to as an intelligent agent because it is contemplated that the module 500 would have one or more intelligent aspects. First, human experts would impart their learning to the module 500 through a fuzzy expert rules base 502 or other inference system that would be part of or available to the integrity module 500. There are many types of errors in a machine process log that humans can quickly and easily detect upon inspection. For example, a machine that made product during a particular day may report an average machine speed of zero (or an otherwise unrealistically low number) due to a recording error. A person reviewing this record would easily spot this inconsistency. A list of known errors and inconsistencies would be compiled into fuzzy if-then rules and the module 500 would be able to automatically navigate a huge amount of data and check the data using the expert rules base 502. In particular, a user 504 would interface with the module 500 a user access subsystem 506. A processor 508 which is part of the module 500 evaluates data in a process information database 510 according to the rules base 502. When an error is indicated in suspect data, the processor 508 may invoke a modification subsystem 520 to affect auto-repair of the suspect data, or the processor 508 may issue an intervention request 512 to request user intervention. The modification subsystem 520 includes predefined instructions for correcting certain clearly incorrect data. In one form, the modification subsystem 520 may be pre-set instructions such as software executed by the processor 508 which would discard data that is inconsistent with other similar data that is more reliable. For example, the data in the process information database 510 may include a large number of data items which fall within a very limited range. Occasional data items which fall beyond that range may be modified to be within the range or may be deleted in their entirety. On the other hand, if a substantial number of data items fall outside the limited range, the processor 508 may issue an intervention request 512, as noted above.

Another intelligent aspect of the module 500 may be a neural network 514 for learning patterns in the data in the process information database 510. By training the neural network 514 with a clear data set found in a storage module 516, the neural network 514 would generate one or more statistical patterns 518 which help define one or more acceptable parameters of the data in the process information database 510. The neural network 514 may be re-trained from time-to-time with updated data from the most current process data in the process information database 510. Preferably, the neural network would perform a higher-order evaluation relating to a historical analysis of data trends in addition to (or instead of) analyzing whether or not data is there or above or below a certain value.

As an example of a higher order evaluation according to the invention, suppose one wants to search an employee database to identify high-potential salespeople. A standard query might search for employees that are 30 years old or younger and that have over $500,000 in sales. This search would miss a 31-year-old employee that had $1,000,000 in sales, as well as the 19-year-old employee with $450,000 in sales. Although a human evaluator would quickly identify these latter employees as high-potential, they would be missed by a standard search.

An expert rule, fuzzy logic search performed by the system or according to the method of the invention would easily identify such missing employees. The search would specify "young employees with high sales." The inference rules governing the fuzzy search would allow an older employee to be included as long as the sales were high enough to compensate. The search would also include employees that had less in sales but that were younger. Thus, higher order evaluation according to the invention makes decisions based on multiple criteria with elastic constraints, similar to how human experts make decisions.

As another example of a higher order evaluation according to the invention, suppose one wants to manage a financial or process reliability database. There are certain periods of manufacturing that should not be included in financial or process reliability analysis. This would include, for example, special manufacturing trials when new equipment was tested on a machine. During this time, the machine may be producing product, but may have a high number of process stops. Since these stops do not reflect standard operation, it may be desirable to remove them from an analysis. A standard data integrity evaluation may filter out time periods that have an excessive number of stops or machine downtime. Unfortunately, this would also remove time periods in which that machine was in normal production, yet was running poorly.

Higher order evaluations according to the system or method of the invention would use fuzzy rules to consider a number of factors, with elastic constraints, in determining whether or not a time period should be included in an analysis. For example, time periods with a high amount of machine downtime but low number of machine stops are usually associated with machine maintenance. Times that include high downtime with a large number of stops in a particular section generally indicate a special manufacturing trial. High machine downtime with a large number stops in many different sections usually indicates general runnability problems with the machine. Higher-order data analysis uses expert rules and learned patterns to better identify data status.

Processor 508 would evaluate the data in the process information database 510 according to the statistical patterns 518 and identify deviations from the patterns, which deviations would be flagged as anomalies. As noted above, the processor may issue an intervention request 512 requesting the user 504 to employ the user access subsystem 506 to correct the data. Alternatively, the processor 508 may execute an auto-repair by employing the modification subsystem 520.

The module 500 may also include a marking subsystem 522 which would tag data. In one aspect, the marking subsystem 522 would tag records which require human intervention and the issuing of intervention request 512. As a specific example, if a data record violated rules base 502 or was determined to be a statistical anomaly with respect to statistical patterns 518, the marking subsystem 522 would flag the record and send an email to user 504 for intervention. If the record was found to be in error, it would be manually corrected by the user 504. If the record was correct, a tag would be marked in the database to signal to the module 500 that the record has been checked and verified for accuracy. Marking subsystem 522 would also mark data which was not suspect as checked and would mark data which was automatically corrected by the modification subsystem 522 as auto-correct data.

Many, if not all, of the above-described aspects of the data integrity module 500 may be implemented by software and/or hardware. Although the block diagrams of FIGS. 4 and 5 illustrate various aspects as separate blocks, it is contemplated that the module 500 may be integrated in a variety of ways into a single modular configuration. For example, the user access subsystem, the modification subsystem and the marking subsystem may all be an integral part of the processor 508. In addition, the clear data set storage module 516 may be part of the process information database 510. Also, module 426 may be part of information exchange 410. Other integrated or separate configurations of the various aspects of the module 500 according to the invention will be apparent to those skilled in the art.

In general, the module 500 constitutes a data integrity system for evaluating data in the process information database 510. The neural network 514 constitutes a resource of reference information for evaluating data according to the reference information. As illustrated in FIG. 5, the reference information comprises statistical patterns 518 generated by the neural network 514 for specifying patterns for the data in the process information database 510 being evaluated. Alternatively, or in addition, the reference information may be rules base 502 specifying rules for evaluating the data. The processor 508 is responsive to the reference information and accesses the data in the process information database 510 for its evaluation. Certain types of suspect data are modified by the modification subsystem 520 automatically. Other suspect data may be modified by user 504 via the user access subsystem 506 and/or in response to an intervention request 512 issued by the processor 508.

Figure 6:
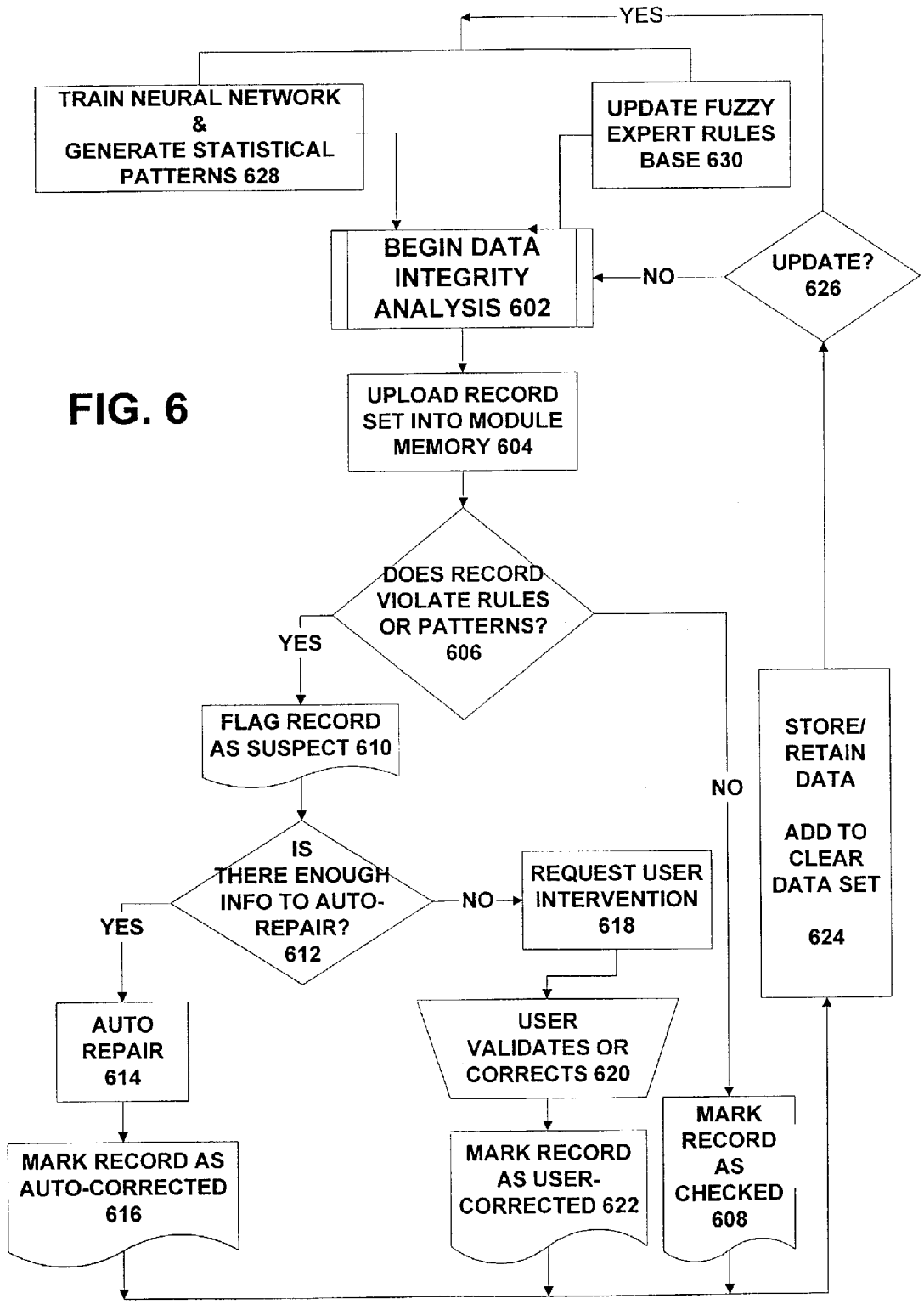
FIG. 6. is a flow chart of the operation of a data integrity module according to the invention.

FIG. 6 is a flow chart illustrating one embodiment of the operation of the data integrity module 500 according to the invention. Data integrity analysis begins with 602 wherein the processor 508 evaluates the data in the database 510 and compares it to the statistical patterns 518 and applies the rules base 502. Usually, this will be preceded by the module uploading a record set from the process information database 510 into its memory as indicated at 604. Alternatively, the data may be analyzed as it is being stored in the process information database 510. After uploading (or during storage), the processor 508 performs the comparative analysis and determines at 606 whether the record being evaluated violates the rules or patterns. If the record does not violate any rules or patterns and is thus not suspect, the record is marked as checked at 608. Otherwise, the module 500 proceeds to 610 to flag the record as suspect. Next, the processor 508 determines whether or not there is enough information to auto-repair the suspect record at 612. In particular, the modification subsystem 520 is invoked. If there is enough information, auto-repair is accomplished at 614 and the record is marked as auto-corrected at 616. If there is not enough information to correct the suspect record, the processor 508 proceeds to request user intervention at 618 by issuing an intervention request 512. At 618, the user validates or corrects the suspect record via the user access subsystem 506 and the record is marked as user-corrected at 622.

After a record has been marked as checked at 608, auto-corrected at 616 or user-corrected at 622, the data is stored or retained in the process information database and added to a clear data set at 624 which may be stored in separate storage module 516 or which may be stored as part of database 510. Next, the processor determines at 626 whether it is time to update the rules base or the statistical patterns. Generally, this determination may be preprogrammed to occur on a regular basis or it may be initiated by an event or by the user. In any case, when an update is desired or necessary, the processor 508 proceeds to 628 to train or re-train the neural network with the clear data set and generate new statistical patterns and/or proceeds to update the fuzzy expert rules base at 630. After such updating, the processor returns to 602 to begin a data integrity analysis of the next record.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. For example, features described in relation to one embodiment may be incorporated into any other embodiment of the invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A data integrity system for evaluating data in a process information database including data generated by a manufacturing process, said system comprising:

an evaluation resource cooperatively associated with reference information, wherein the evaluation resource comprises a neural network and wherein the reference information comprises statistical patterns generated by the neural network for specifying patterns for the data being evaluated;

a processor, responsive to the reference information, for accessing the data in the process information database and for evaluating the accessed data according to the reference information, the processor identifying suspect data in the evaluated data; and a modification subsystem responsive to the processor for modifying at least some of the suspect data in the process information database.

2. The system of claim 1 wherein the reference information comprises a fuzzy expert rules base specifying rules for evaluating the data.

3. The system of claim 1 further comprising a storage module for storing a clear data set which does not include suspect data, and wherein the neural network generates the statistical patterns based on the clear data set.

4. The system of claim 1 wherein the reference information further comprises a fuzzy expert rules base specifying rules for evaluating the data, and further comprising a marking subsystem for marking evaluated data as one or more of the following: suspect when its accuracy is inconsistent with the reference information, auto-corrected when suspect data has been corrected without user intervention, user-corrected when the suspect data has been corrected by the user, and/or checked when its accuracy is consistent with the reference information.

5. The system of claim 4 wherein the neural network performs a higher-order evaluation relating to a historical analysis of data trends and/or analyzes whether or not data is present in the database and/or whether data is above or below a certain value.

6. A data integrity system for evaluating data in a process information database including data generated by a manufacturing process, said system comprising:
an evaluation resource cooperatively associated with reference information, wherein the reference information comprises a rules base specifying rules for evaluating the data;
a processor, responsive to the reference information, for accessing the data in the process information database and for evaluating the accessed data according to the reference information, the processor identifying suspect data in the evaluated data; and
a modification subsystem responsive to the processor for modifying at least some of the suspect data in the process information database.

7. A data integrity module for evaluating data in a process information database including data generated by a manufacturing process, said module comprising:
a neural network generating statistical patterns for specifying patterns for the data being evaluated;
a rules base specifying rules for evaluating the data;
a processor1 responsive to the rules base and the statistical patterns, for identifying suspect data in the process information database by evaluating the data according to the rules base and the statistical patterns; and
modification system for modifying the suspect data in the process information database.

8. The module of claim 7 wherein the modification system comprises a modification subsystem responsive to the processor for modifying at least some of the suspect data in the process information database and a user access subsystem for permitting a user to modify certain of the identified suspect data.

9. The module of claim 7 further comprising a storage module for storing a clear data set which does not include suspect data and wherein the neural network generates the statistical patterns based on the clear data set.

10. The module of claim 7 further comprising a marking subsystem for marking evaluated data as one or more of the following: suspect when its accuracy is inconsistent with the rules base and the statistical patterns; auto-corrected when suspect data has been corrected without user intervention; user-corrected when the suspect data has been corrected by the user; and checked when its accuracy is consistent with the rules base and the statistical patterns.

11. The module of claim 7 wherein the process information database comprises one or more of the following: a raw materials database, a waste and delay database, a productivity database, a quality database and a machine process database.

12. The module of claim 7 wherein the manufacturing process produces a product including one or more of the following products or parts therefor: pharmaceuticals, automobiles, food and beverage, pulp and paper, injection molded items, electronics, and printed items.

13. The module of claim 7 wherein the neural network performs a higher-order evaluation relating to a historical analysis of data trends and/or analyzes whether or not data is present in the database and/or whether data is above or below a certain value.

14. The module of claim 7 wherein the rules base further comprises a fuzzy expert rules base specifying rules for evaluating the data.

15. In a system for manufacturing absorbent garments from raw material by a process implemented by a product line, wherein the system has a process information database of data relating to the process, the improvement comprising a data integrity module for evaluating the data in the process information database including data generated by a manufacturing process, said module comprising:
a neural network generating statistical patterns for specifying patterns for the data being evaluated;
a rules base specifying rules for evaluating the data;
a processor, responsive to the rules base and the statistical patterns, for identifying suspect data in the process information database by evaluating the data according to the rules base and the statistical patterns; and
a modification system for modifying the suspect data in the process information database.

16. The system of claim 15 wherein the modification system comprises a modification subsystem responsive to the processor for modifying at least some of the suspect data in the process information database and a user access subsystem for permitting a user to modify certain of the identified suspect data.

17. The system of claim 15 further comprising a storage module for storing a clear data set which does not include suspect data and wherein the neural network generates the statistical patterns based on the clear data set.

18. The system of claim 15 further comprising a marking subsystem for marking evaluated data as one or more of the following: suspect when its accuracy is inconsistent with the rules base and the statistical patterns; auto-corrected when suspect data has been corrected without user intervention; user-corrected when the suspect data has been corrected by the user; and/or checked when its accuracy is consistent with the rules base and the statistical patterns.

19. The system of claim 18 wherein the process information database comprises one or more of the following: a raw materials database, a waste and delay database, a productivity database, a quality database and a machine process database.

20. The system of claim 15 wherein the neural network performs a higher-order evaluation relating to a historical analysis of data trends and/or analyzes whether or not data is present in the database and/or whether data is above or below a certain value.

21. The system of claim 15 wherein the manufacturing process produces a product including one or more of the following products or parts therefor: pharmaceuticals, automobiles, food and beverage, pulp and paper, injection molded items, electronics, and printed items.

22. The module of claim 15 wherein the rules base further comprises a fuzzy expert rules base specifying rules for evaluating the data.

23. A method for evaluating data integrity in a process information database including data generated by a manufacturing process, said method comprising:
providing reference information, wherein the reference information comprises statistical patterns generated by a neural network for specifying patterns for the data being evaluated;
accessing the data in the process information database;
evaluating the accessed data according to the reference information;
identifying suspect data in the evaluated data; and
modifying at least some of the suspect data in the process information database.

24. The method of claim 23 wherein the reference information comprises a rules base specifying rules for evaluating the data.

25. The method of claim 23 further comprising storing a clear data set which does not include suspect data and wherein the neural network generates the statistical patterns based on the clear data set.

26. The method of claim 23 wherein the neural network performs a higher-order evaluation relating to a historical analysis of data trends and/or analyzes whether or not data is present in the database and/or whether data is above or below a certain value.

27. A method for evaluating data integrity in a process information database including data generated by a manufacturing process, said method comprising:
provides reference information, wherein the reference information comprises a rules base specifying rules for evaluating the data;
accessing the data in the process information database;
evaluating the accessed data according to the reference information;
identifying suspect data in the evaluated data; and
modifying at least some of the suspect data in the process information database.

28. A method for evaluating data integrity in a process information database including data generated by a manufacturing process, said method comprising:
providing reference information;
accessing the data in the process information database;
evaluating the accessed data according to the reference information;
identifying suspect data in the evaluated data;
modifying at least some of the suspect data in the process information database; and
permitting a user to modify certain of the identified suspect data.

29. A method for evaluating data integrity in a process information database including data generated by a manufacturing process, said method comprising:
providing reference information;
accessing the data in the process information database;
evaluating the accessed data according to the reference information;
identifying suspect data in the evaluated data;
modifying at least some of the suspect data in the process information database; and
marking evaluated data as one or more of the following: suspect when its accuracy is inconsistent with the reference information, auto-corrected when suspect data has been corrected without user interventiont, user-corrected when the suspect data has been corrected by the user, and/or checked when its accuracy is consistent with the reference information.

30. The method of claim 29 wherein the resource comprises a neural network and wherein the reference information comprises statistical patterns generated by a neural network for specifying patterns for the data being evaluated and wherein the reference information further comprises a fuzzy expert rules base specifying rules for evaluating the data.

31. The method of claim 30 wherein the neural network performs a higher-order evaluation relating to a historical analysis of data trends and/or analyzes whether or not data is present in the database and/or whether data is above or below a certain value.

32. A method for evaluating data integrity in a process information database including data generated by a manufacturing process, said method comprising:
providing reference information;
accessing the data in the process information database;
evaluating the accessed data according to the reference information;
identifying suspect data in the evaluated data; and
modifying at least some of the suspect data in the process information database, wherein the process information database comprises one or more of the following: a raw materials database, a waste and delay database, a productivity database, a quality database and a machine process database.

* * * * *